US012608047B2

(12) United States Patent
Lee et al.

(10) Patent No.: US 12,608,047 B2
(45) Date of Patent: Apr. 21, 2026

(54) DISPLAY DEVICE

(71) Applicant: LG ELECTRONICS INC., Seoul (KR)

(72) Inventors: Minjae Lee, Seoul (KR); Woosuk Park, Seoul (KR); Myungwhoon Lee, Seoul (KR); Jungyup Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 18/691,026

(22) PCT Filed: Oct. 22, 2021

(86) PCT No.: PCT/KR2021/014925
§ 371 (c)(1),
(2) Date: Mar. 11, 2024

(87) PCT Pub. No.: WO2023/038191
PCT Pub. Date: Mar. 16, 2023

(65) Prior Publication Data
US 2024/0377860 A1 Nov. 14, 2024

(30) Foreign Application Priority Data
Sep. 13, 2021 (KR) ........................ 10-2021-0121639

(51) Int. Cl.
G06F 1/16 (2006.01)
(52) U.S. Cl.
CPC .......... G06F 1/1652 (2013.01); G06F 1/1656 (2013.01)

(58) Field of Classification Search
CPC .... G06F 1/1601; G06F 1/1652; G06F 1/1656; H04N 5/64; G02F 1/133308; G02F 1/133322; G02F 2201/46
See application file for complete search history.

(56) References Cited

U.S. PATENT DOCUMENTS

2011/0249425 A1* 10/2011 Aurongzeb ............. F21V 14/02
362/102
2013/0207946 A1 8/2013 Kim et al.
(Continued)

FOREIGN PATENT DOCUMENTS

EP 2938068 10/2015
KR 1020150062098 6/2015
(Continued)

OTHER PUBLICATIONS

European Patent Office Application Serial No. 21956896.1, Search Report dated Aug. 7, 2025, 8 pages.
(Continued)

*Primary Examiner* — Sagar Shrestha
*Assistant Examiner* — Peter Krim
(74) *Attorney, Agent, or Firm* — LEE, HONG, DEGERMAN, KANG & WAIMEY

(57) ABSTRACT
A display device is disclosed. The display device may comprise: a flexible display panel; a flexible plate which is disposed at the rear of the display panel and to which the display panel is coupled; a drive unit which is coupled to the rear of the plate and provides rotational force; and an arm which is elongated, one side of which is connected to the drive unit to be pivotable by the rotational force, and the other side of which supports the display panel.

13 Claims, 13 Drawing Sheets

(56)          References Cited

U.S. PATENT DOCUMENTS

| 2014/0354519 | A1* | 12/2014 | Lee | G09F 9/301 |
| | | | | 345/76 |
| 2014/0376163 | A1* | 12/2014 | Song | G09F 9/301 |
| | | | | 361/679.01 |
| 2016/0040764 | A1* | 2/2016 | Park | G09F 9/301 |
| | | | | 361/679.01 |
| 2016/0342179 | A1* | 11/2016 | Osborne | B23K 1/0016 |
| 2017/0347466 | A1* | 11/2017 | Kang | G09G 3/20 |
| 2022/0351649 | A1* | 11/2022 | Park | F16M 11/08 |

FOREIGN PATENT DOCUMENTS

| KR | 101720178 | 3/2017 |
| KR | 1020190003209 | 1/2019 |
| KR | 102193921 | 12/2020 |

OTHER PUBLICATIONS

PCT International Application No. PCT/KR2021/014925, International Search Report dated Jun. 8, 2022, 2 pages.

\* cited by examiner

[FIG. 1]
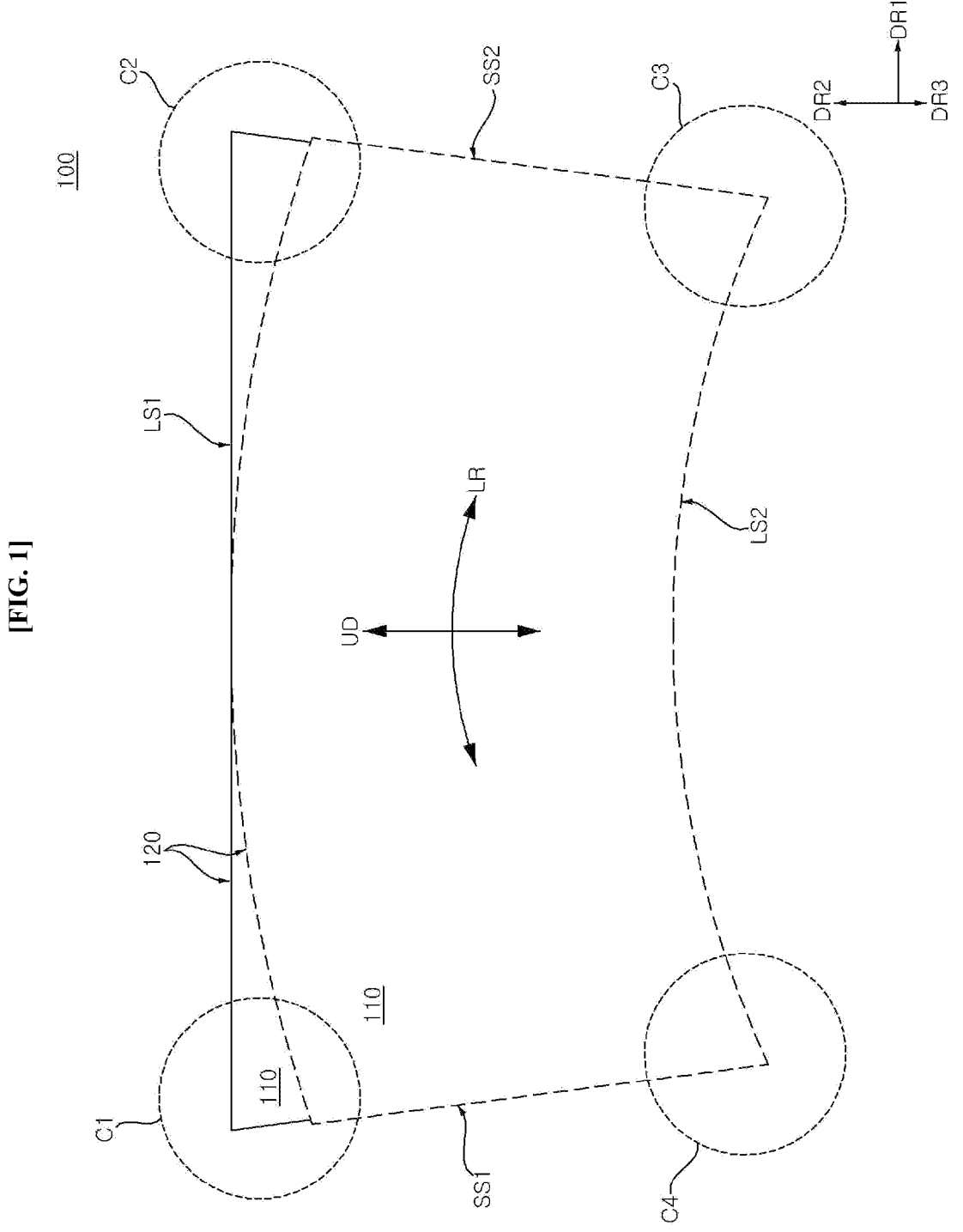

[FIG. 2]
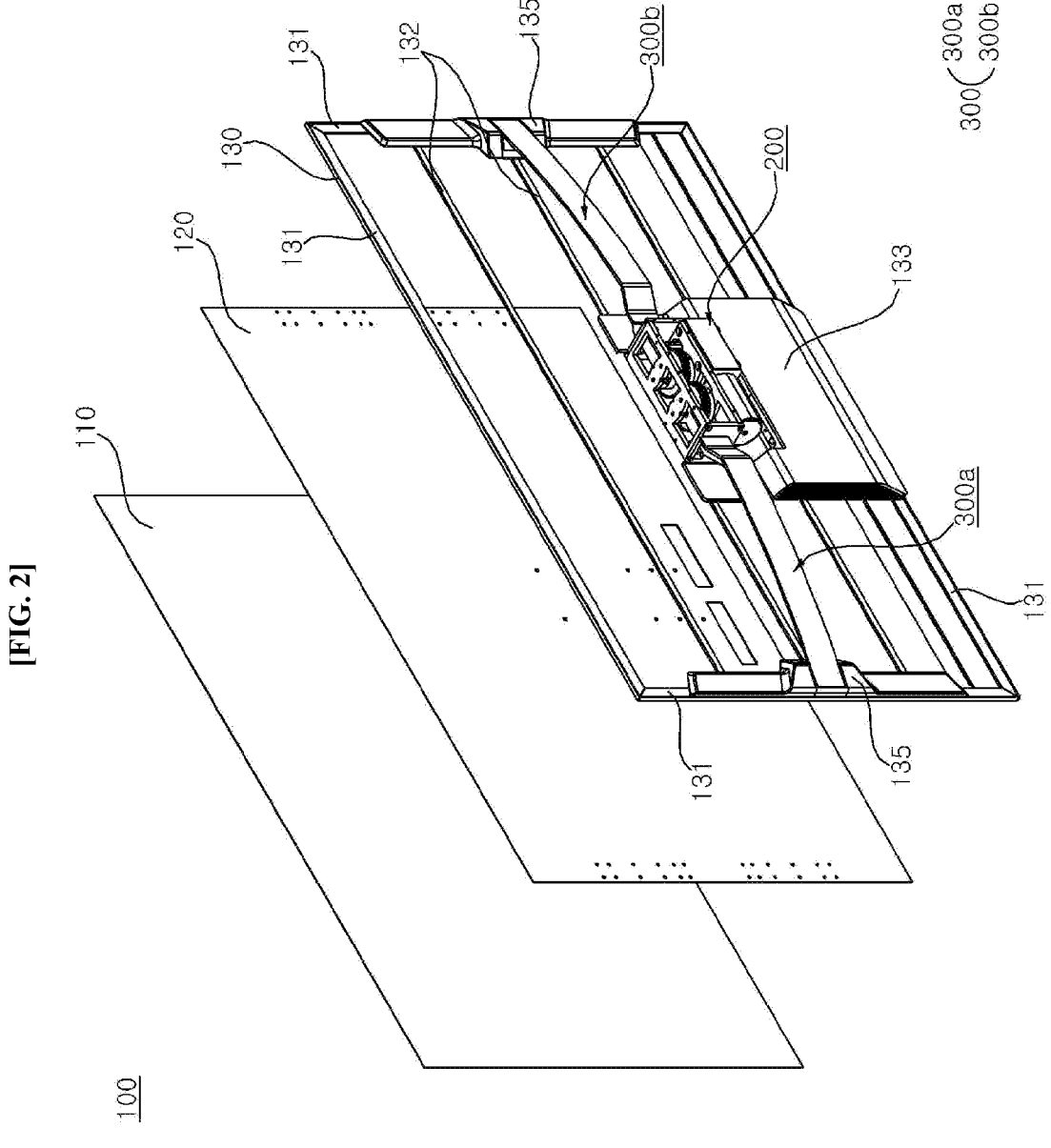

[FIG. 3]
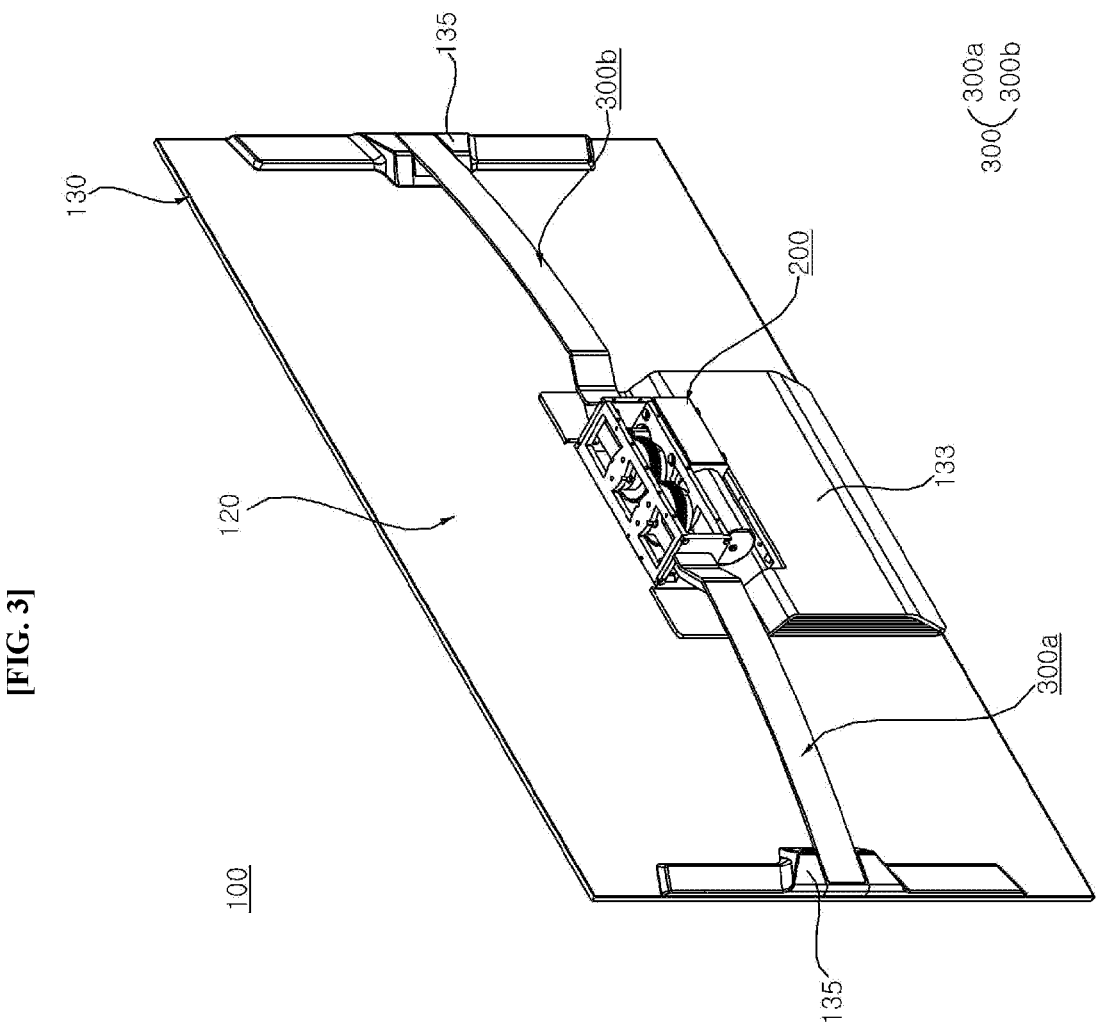

[FIG. 4]
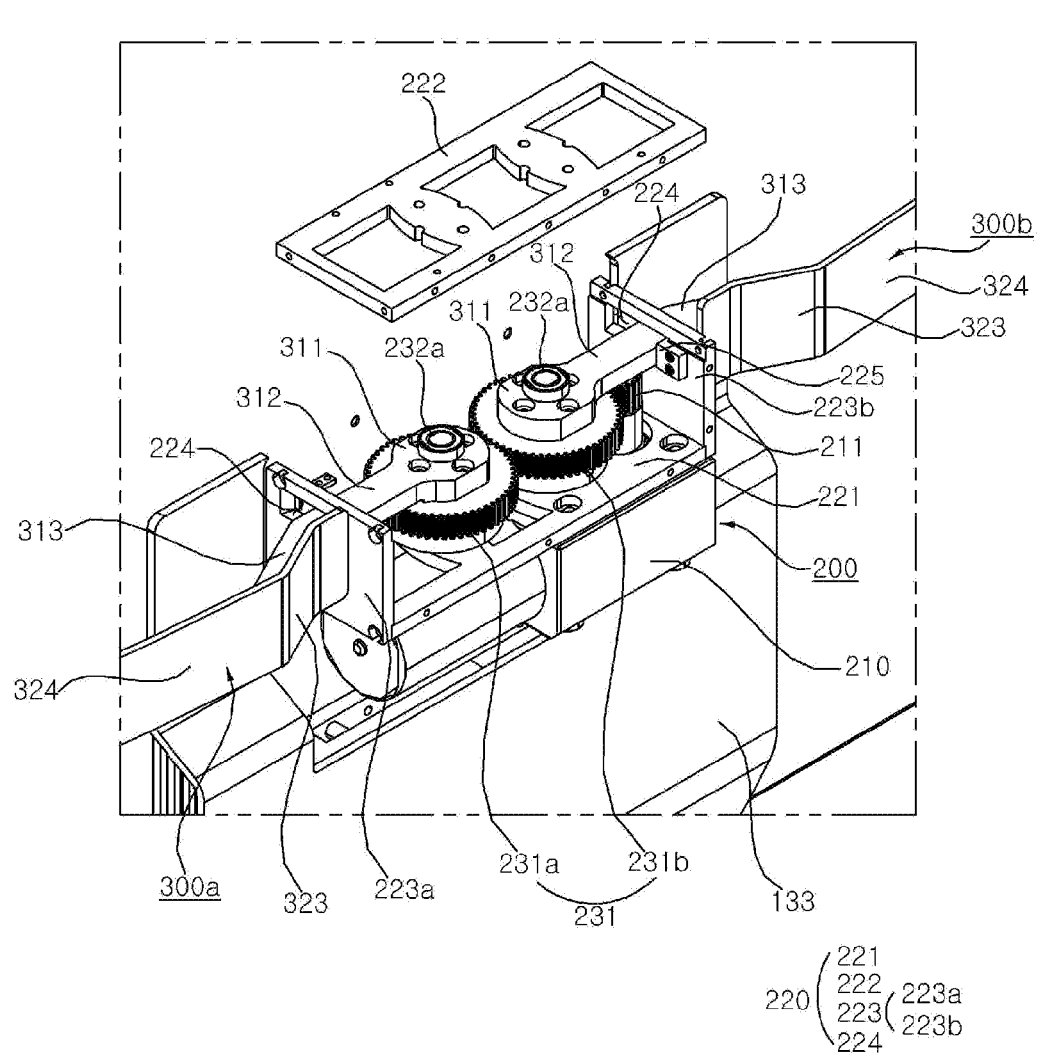

[FIG. 5]
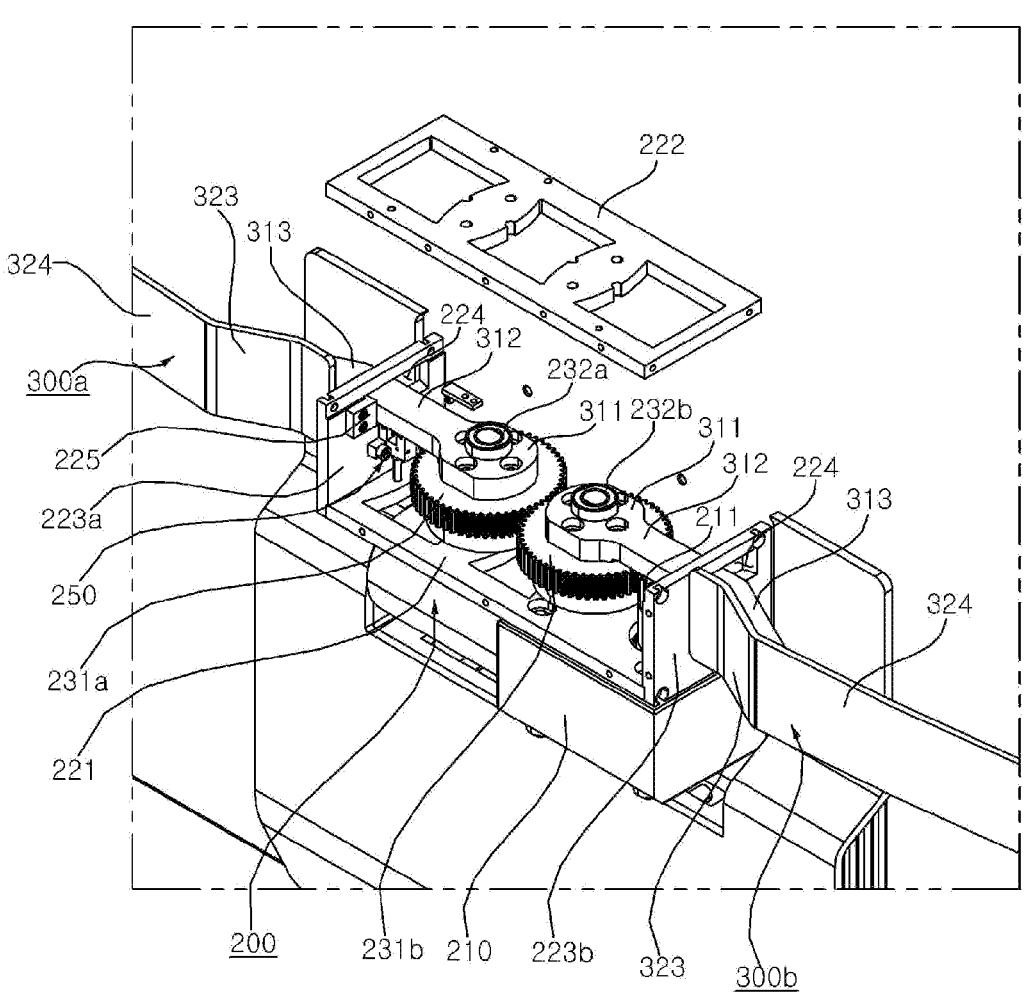

[FIG. 6]
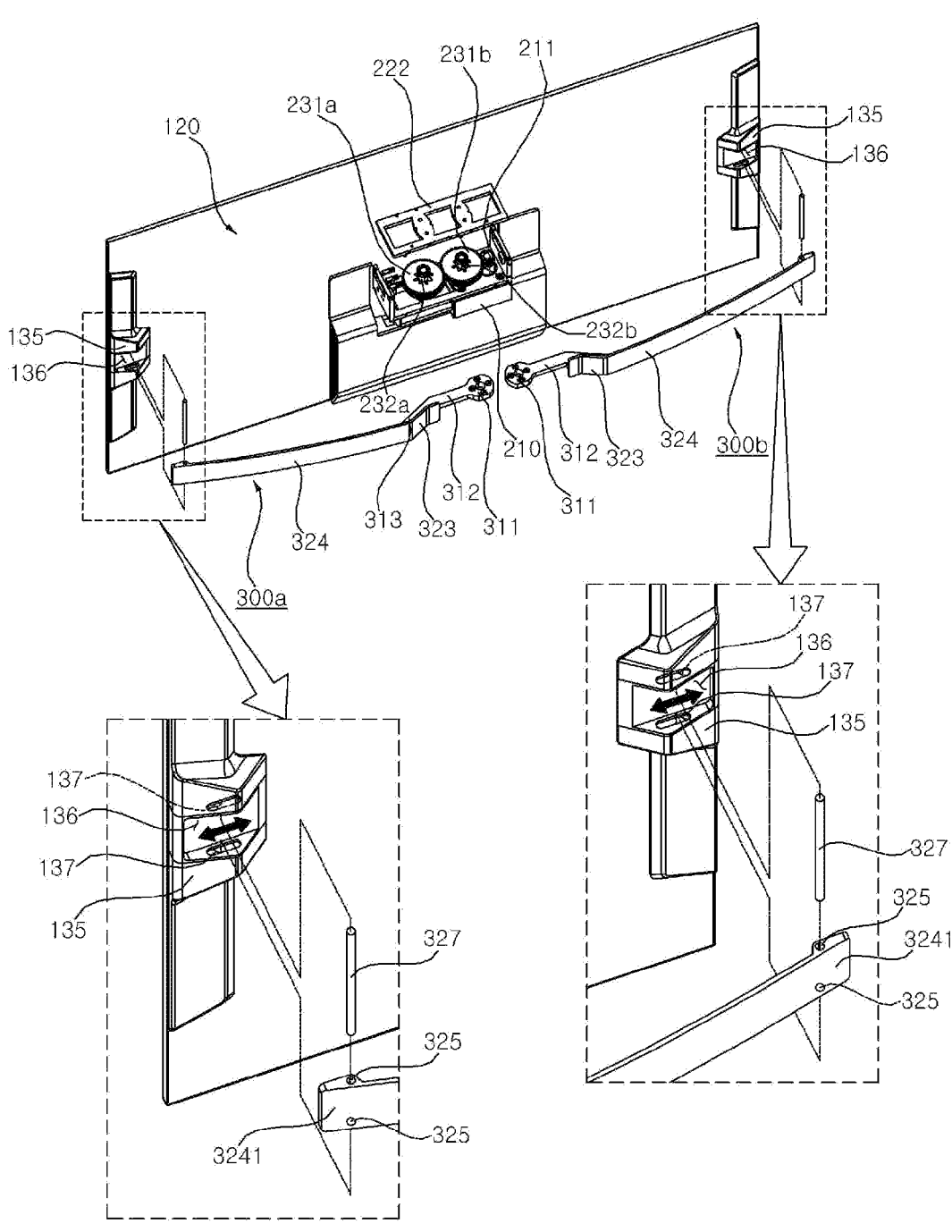

[FIG. 7]
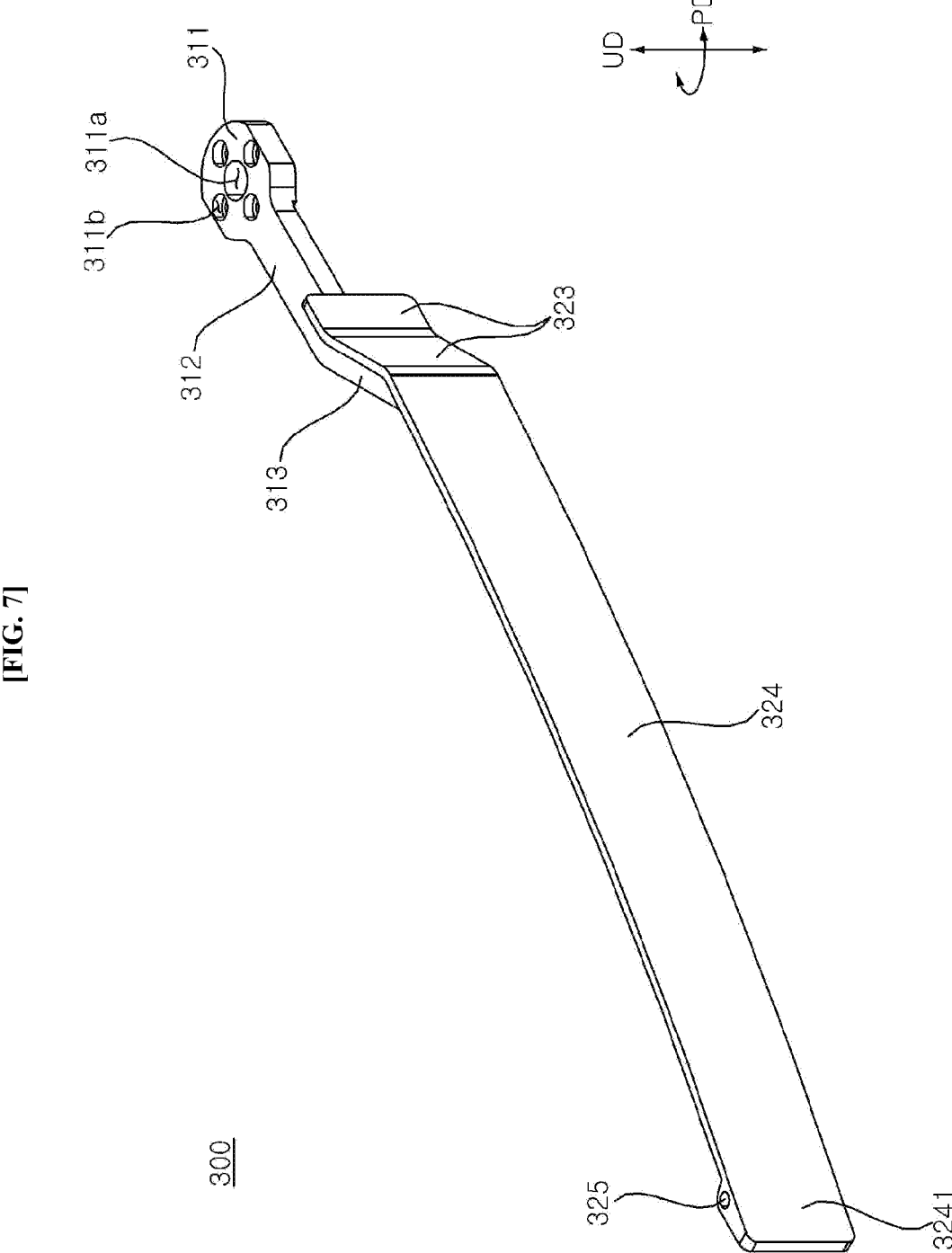

[FIG. 8]
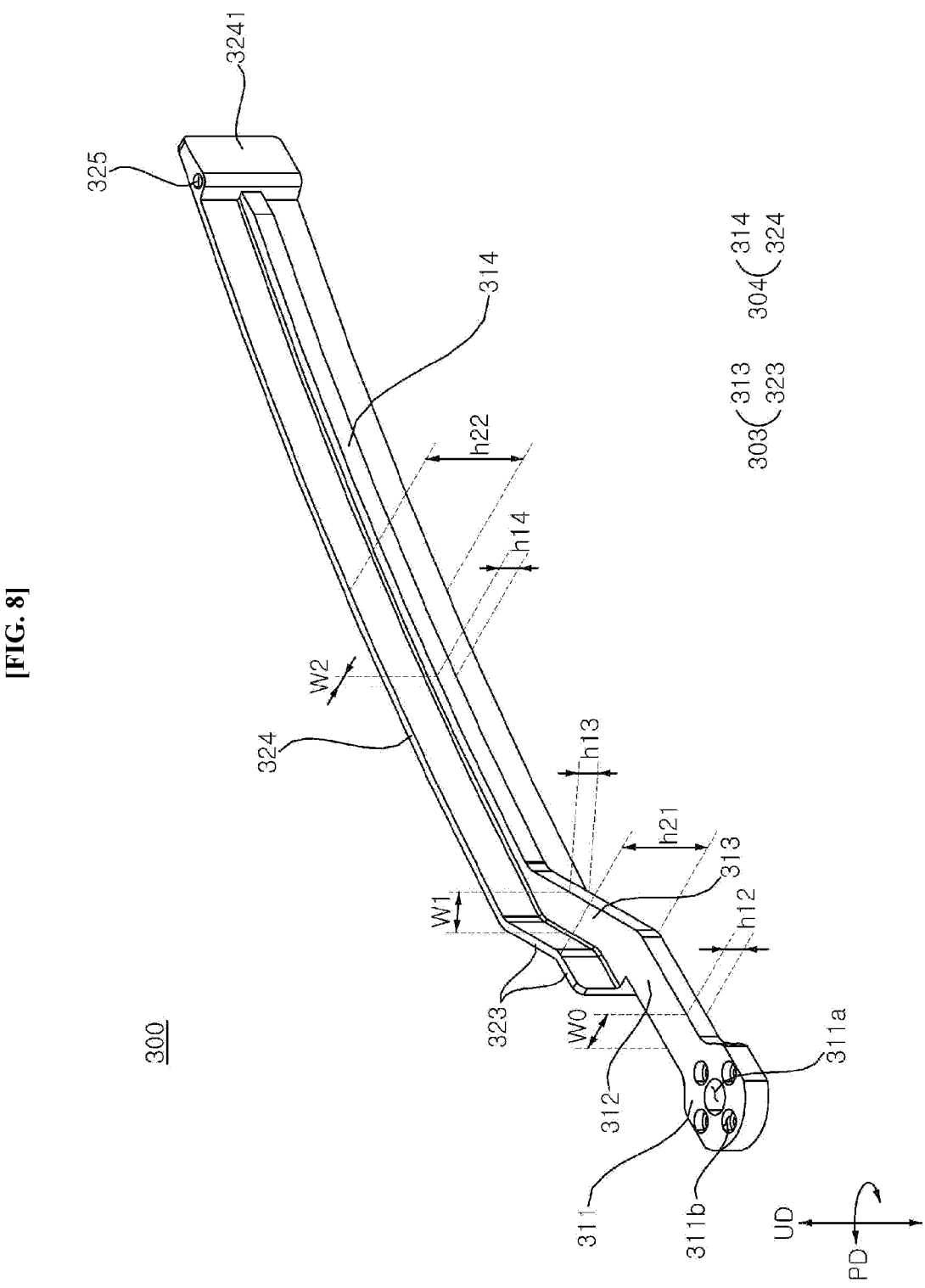

[FIG. 9]
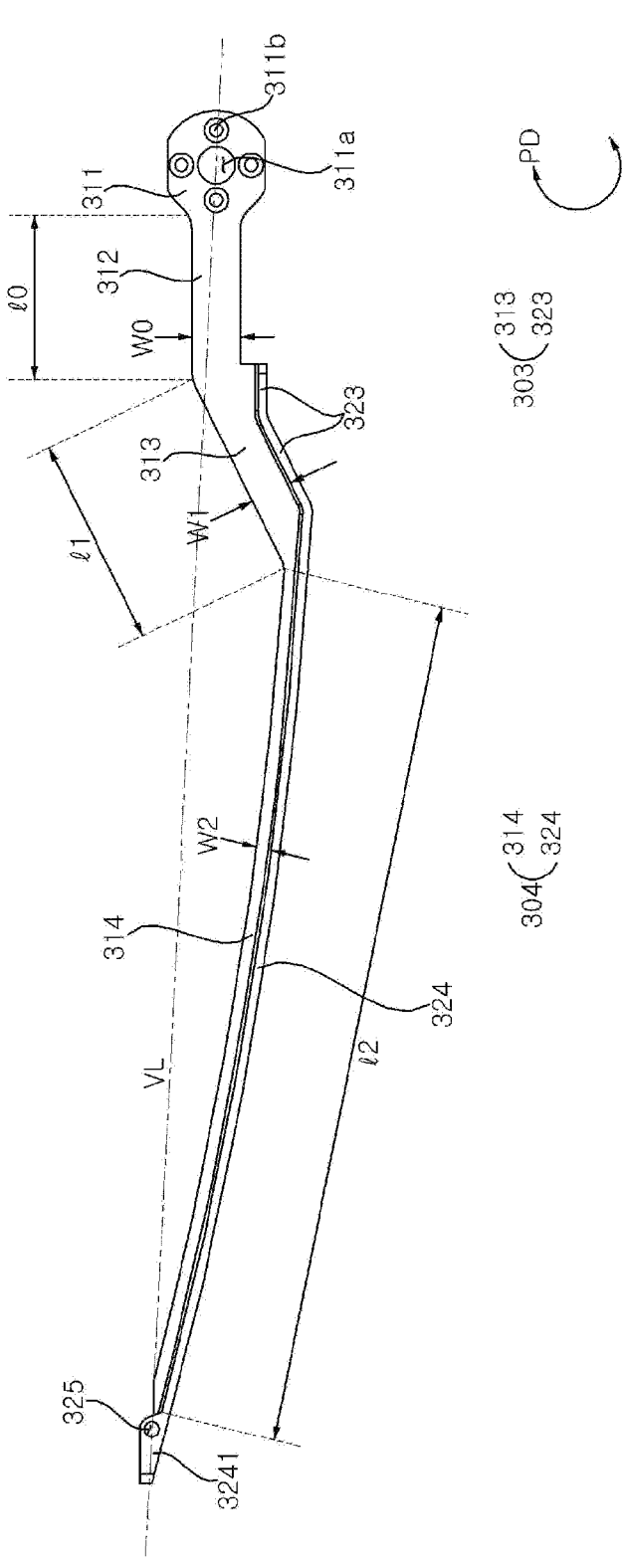

[FIG. 10]
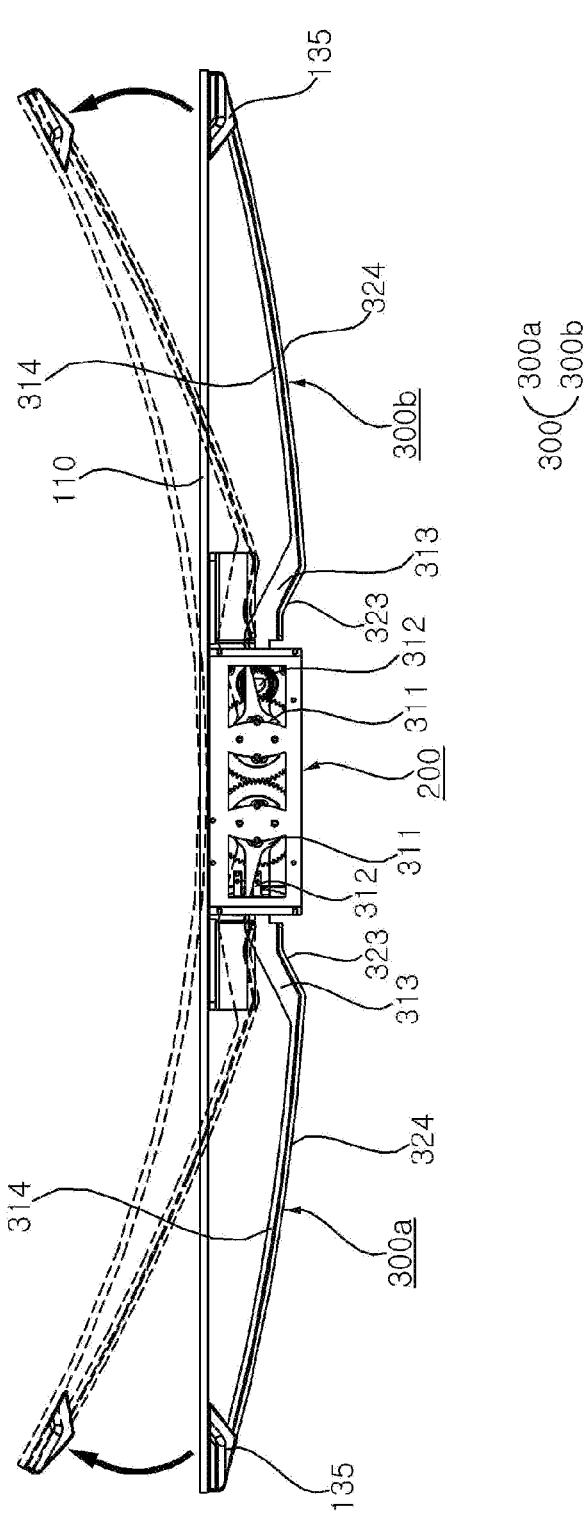

[FIG. 11]
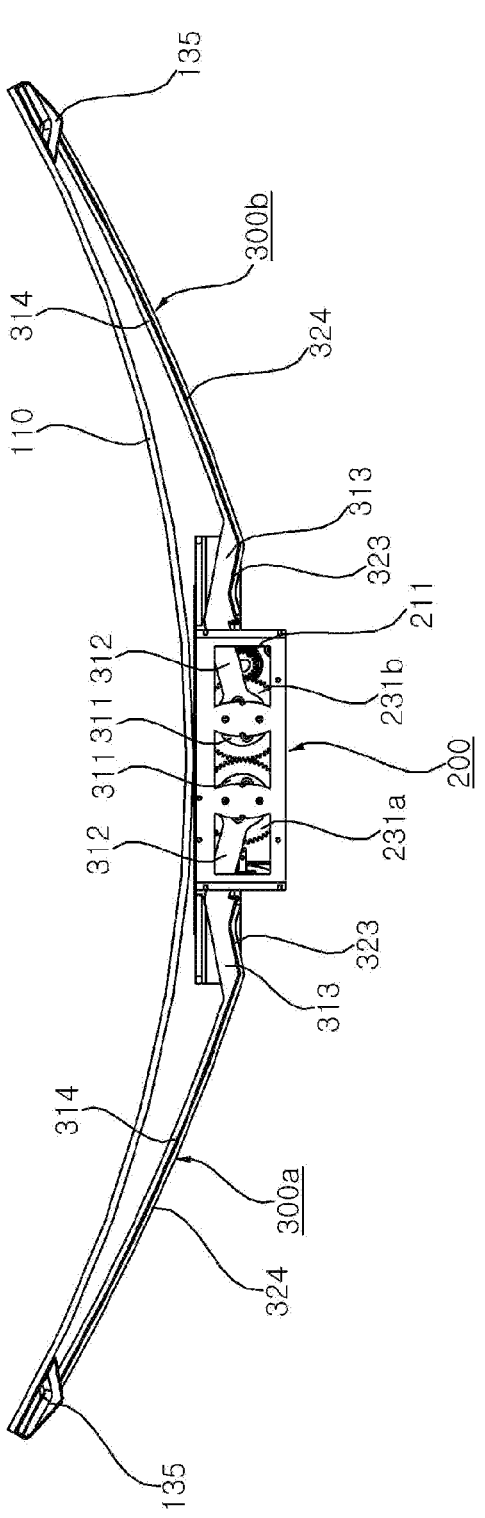

[FIG. 12]
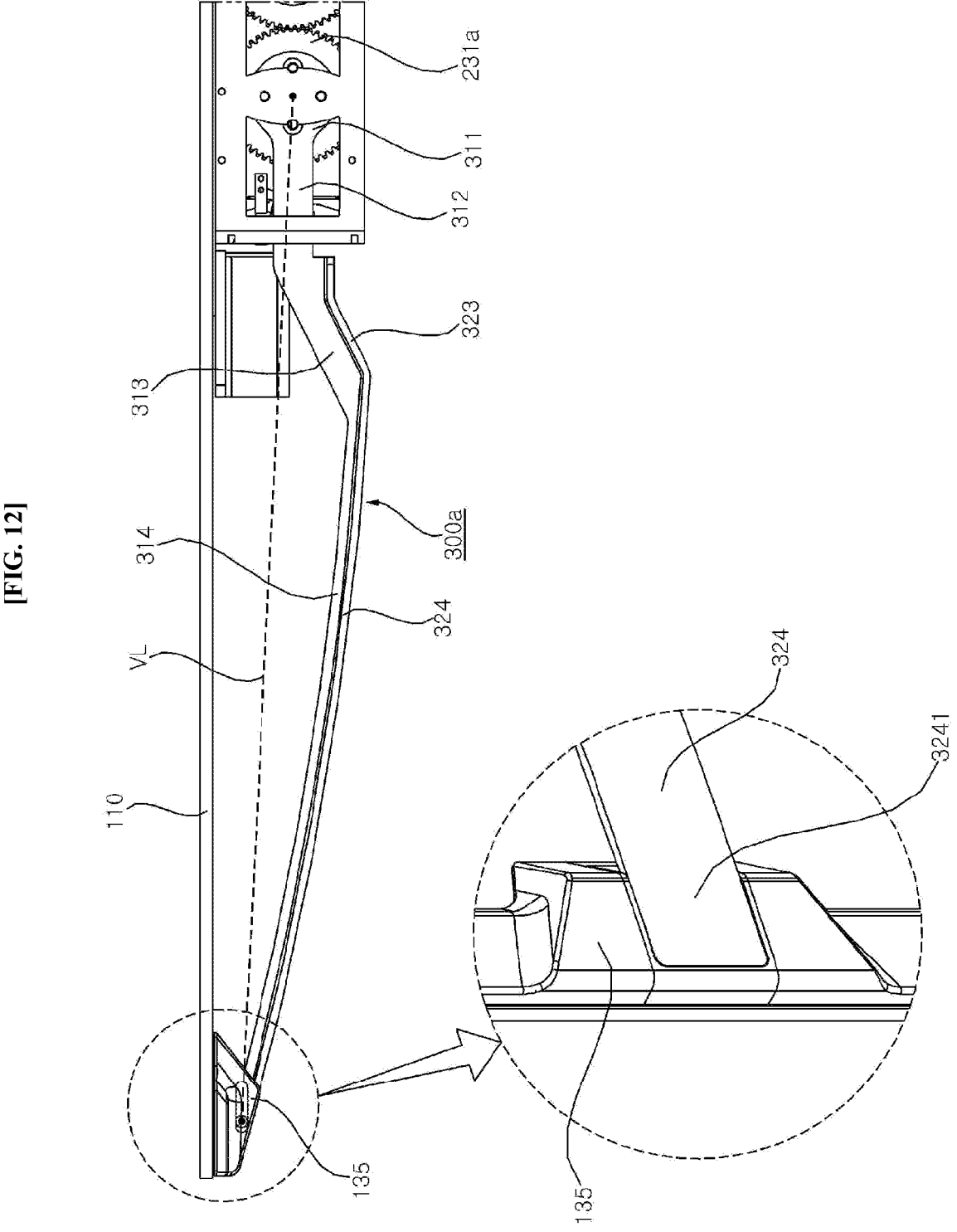

[FIG. 13]
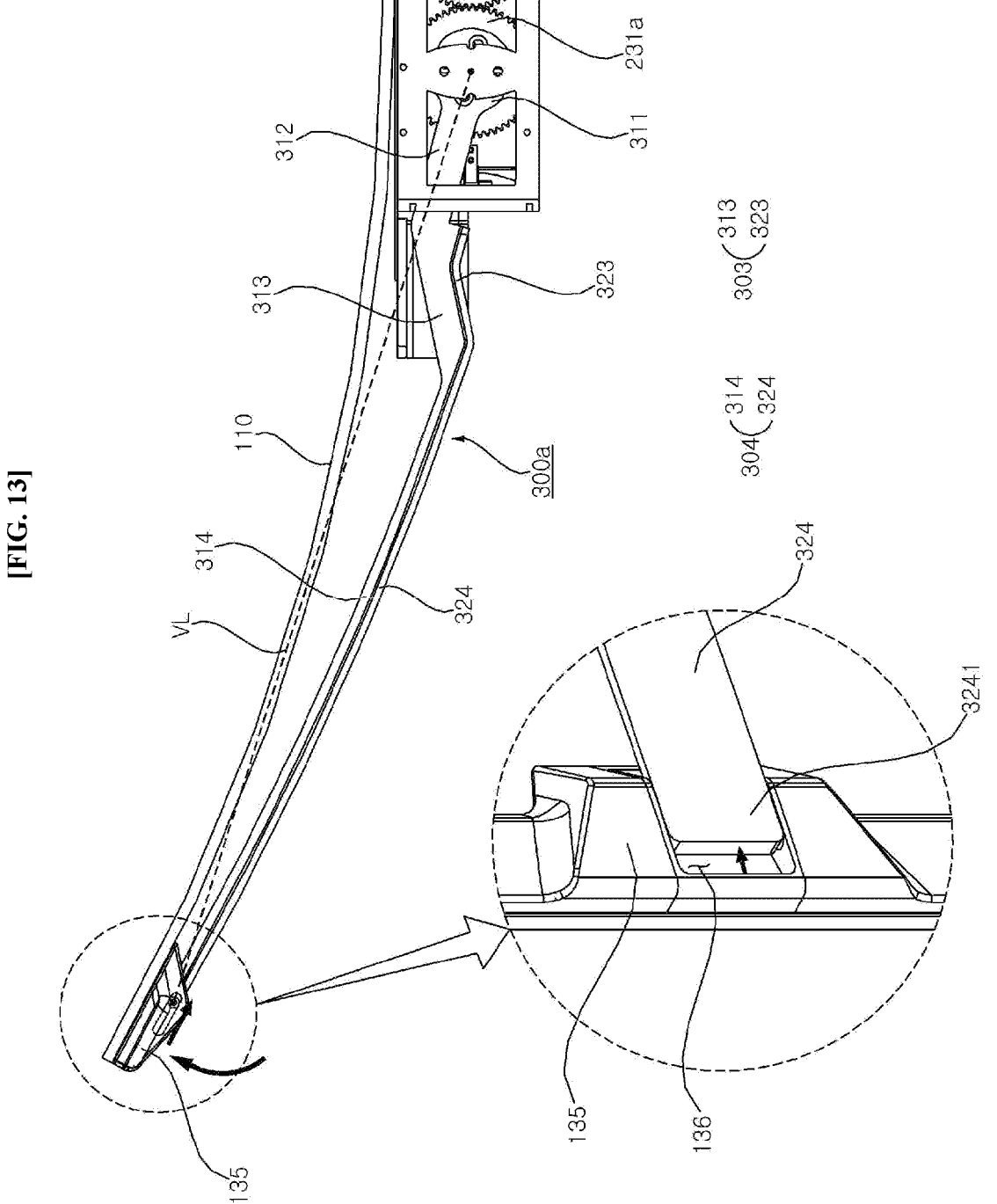

DISPLAY DEVICE

CROSS-REFERENCE TO RELATED APPLICATION(S)

This application is the National Stage filing under 35 U.S.C. 371 of International Application No. PCT/KR2021/014925, filed on Oct. 22, 2021, which claims the benefit of earlier filing date and right of priority to Korean Application No. 10-2021-0121639, filed on Sep. 13, 2021, the contents of which are all incorporated by reference herein in their entirety.

TECHNICAL FIELD

The present disclosure relates to a display device. More particularly, the present disclosure relates to a display device capable of changing the curvature of a display panel.

BACKGROUND ART

With the development of the information society, various demands for display devices are on the rise. Recently, various display devices, such as, liquid crystal display devices (LCDs), electroluminescent displays (ELDs), vacuum fluorescent displays (VFDs), and organic light emitting diodes (OLEDs) have been researched and used to meet these demands.

Among them, OLED panels can display an image since they have a self-emissive organic layer deposited on a substrate where a transparent electrode is formed. The OLED panels are thin and flexible. A lot of research is being conducted on the structural characteristics of display devices with such an OLED panel.

DETAILED DESCRIPTION OF INVENTION

Technical Problems

An objective of the present disclosure is to solve the above-described problems and other problems. Another objective may be to provide a structure that allows freely changing the curvature of a display panel.

Another objective may be to provide a mechanism that allows freely changing the curvature of a display.

Technical Solution

In accordance with an aspect of the present disclosure to achieve the above or other objectives, a display device may include: a flexible display panel; a flexible plate which is positioned behind the display panel and to which the display panel is coupled; a driving unit coupled to a rear of the plate and providing a rotational force; and an arm extending long, having one side pivotally connected to the driving unit by the rotational force, and having the other side supporting the display panel.

Effect of Invention

According to at least one embodiment of the present disclosure, it is possible to provide a structure that allows freely changing the curvature of a display panel.

According to at least one embodiment of the present disclosure, it is possible to provide a mechanism that allows freely changing the curvature of a display.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWING

FIGS. 1 to 13 are views illustrating examples of a display device according to embodiments of the present disclosure.

MODE FOR CARRYING OUT THE INVENTION

Hereinafter, the embodiments disclosed in the present specification will be described in detail with reference to the accompanying drawings, but the same or similar components are assigned the same reference numerals regardless of reference numerals, and overlapping descriptions thereof will be omitted.

The suffixes "module" and "portion" for the components used in the following description are given or mixed in consideration of only the ease of writing the specification, and do not have distinct meanings or roles by themselves. In describing the embodiments disclosed in the present specification, if it is determined that detailed descriptions of related known technologies may obscure the gist of the embodiments disclosed in the present specification, the detailed descriptions thereof will be omitted. In addition, the accompanying drawings are only for easy understanding of the embodiments disclosed in the present specification, and the technical spirit disclosed in the present specification is not limited by the accompanying drawings, and it should be understood that the present disclosure includes all changes, equivalents and substitutes included in the spirit and technical scope of the present disclosure.

Terms including ordinal numbers such as first, second, etc. may be used to describe various constituent elements, but the constituent elements are not limited by the terms. The above terms are used only for the purpose of distinguishing one constituent element from another.

When one constituent element is mentioned as being "coupled" or "connected" to another constituent element, it should be understood that one constituent element can be coupled or connected directly to another constituent element, but another constituent element can also be present between the constituent elements. Meanwhile, when one constituent element is mentioned as being "coupled directly to" or "connected directly to" another constituent element, it should be understood that another constituent element is not present between the constituent elements.

Singular expressions include plural expressions unless clearly described as different meanings in the context.

In the present specification, it should be understood that the terms such as "include", "comprise" or "have" are intended to specify the existence of a feature, number, step, operation, element, component, or a combination thereof described in the specification, but do not preclude the existence or addition possibility of one or more other features, numbers, steps, operations, elements, components, or combinations thereof.

Hereinafter, an organic light emitting diode OLED will be described as an example of the display panel, but the display panel applicable to the present disclosure is not limited to an OLED panel.

In addition, as used hereinbelow, a display device may include a first long side LS1, a second long side LS2 opposite the first long side LS1, a first short side SS1 adjacent to one end of the first long side LS1 and one end of the second long side LS2, and a second short side SS2 opposite the first short side SS1.

Here, an area of the first short side SS1 may be referred to as a first side area, an area of the second short side SS2 may be referred to as a second side area facing the first side area, an area of the first long side LS1 may be referred to as a third side area adjacent to the first side area and the second side area, and positioned between the first side area and the second side area, and an area of the second long side LS2 may be referred to as a fourth side area adjacent to the first side area and the second side area, positioned between the first side area and the second side area, and facing the third side area.

Moreover, for convenience of description, it is illustrated and described that lengths of the first and second long sides LS1 and LS2 are larger than lengths of the first and second short sides SS1 and SS2, respectively, but the lengths of the first and second long sides LS1 and LS2 may be approximately equal to the lengths of the first and second short sides SS1 and SS2, respectively.

Moreover, hereinafter, a first direction DR1 may be a direction parallel to the long sides LS1 and LS2 of the display device, and a second direction DR2 may be a direction parallel to the short sides SS1 and SS2 of the display device. A third direction DR3 may be a direction perpendicular to the first direction DR1 and/or the second directions DR2.

The first direction DR1 and the second direction DR2 may be collectively referred to as a horizontal direction. In addition, the third direction DR3 may be referred to as a vertical direction.

A side where the display device displays an image may be referred to as a front or a front side. When the display device displays an image, a side where the image is not observed may be referred to as a rear or a rear side. When the display device is viewed from the front, the first long side LS1 may be referred to as an upper side or upper surface. Similarly, the second long side LS2 may be referred to as a lower side or lower surface. Likewise, the first short side SS1 may be referred to as a left side or left surface, and the second short side SS2 may be referred to as a right side or right surface.

In addition, the first long side LS1, the second long side LS2, the first short side SS1, and the second short side SS2 may be referred to as an edge of the display device. Further, a point where the first long side LS1, the second long side LS2, the first short side SS1, and the second short side SS2 meet one another may be referred to as a corner. For example, a point where the first long side LS1 and the first short side SS1 meet may be a first corner C1, a point where the first long side LS1 and the second short side SS2 meet may be a second corner C2, a point where the second short side SS2 and the second long side LS2 meet may be a third corner C3, and a point where the second long side LS2 and the first short side SS1 meet may be a fourth corner C4.

Here, a direction from the first short side SS1 toward the second short side SS2 or a direction from the second short side SS2 toward the first short side SS1 may be referred to as a left-right direction LR. A direction from the first long side LS1 toward the second long side LS2 or a direction from the second long side LS2 toward the first long side LS1 may be referred to as an up-down direction UD.

Referring to FIG. 1, a plate 120 may be flexible. For example, the plate 120 may be a metal plate. The plate 120 may be referred to as a flexible plate 120, a frame 120, or a module cover 120. The display panel 110 may be positioned in front of or on a front surface of the plate 120. The display panel 110 may be flexible. For example, the display panel 110 may be an OLED panel.

The display panel 110 is provided on a front surface of the display device 100 and can have an image displayed on it. The display panel 110 may divide an image into a plurality of pixels and output the image by adjusting the color, brightness, and saturation of each pixel. The display panel 110 may generate light corresponding to a color of red, green, or blue according to a control signal.

The display device 100 may have a variable curvature. In the display device 100, left and right sides of the display device 100 may move forward. For example, in a state where an image is viewed from the front of the display device 100, the display device 100 may be curved concavely. In this case, the plate 120 may be bent with the same curvature as the display panel 110. Alternatively, the display panel 110 may be bent to correspond to the curvature of the plate 120.

Referring to FIGS. 2 and 3, the plate 120 may be coupled to the rear of the display panel 110. The plate 120 may support the rear of the display panel 110. The plate 120 may have a shape corresponding to the display panel 110.

A frame 130 may be disposed at the rear of the display panel 110 and/or the plate 120. The frame 130 may support the rear of the display panel 110 and/or the plate 120.

The frame 130 may include an edge portion 131 and a rib portion 132. The edge portion 131 may surround and support the edge of the display panel 110 and/or the plate 120. The edge portion 131 may form the periphery of the frame 130. The rib portion 132 may extend from one side of the edge portion 132 to the other side and connect one side and the other side of the edge portion 132. The rib portion 132 may extend lengthwise so as to be disposed on the same plane as the direction in which the display panel 110 pivots. The rib portion 132 may extend lengthwise in a left-right direction. The rib portion 132 may support the rear of the display panel 110 and/or the plate 120.

A box 133 may be coupled to the frame 130. Electrical equipment such as a board may be disposed inside the box 133.

An arm fastening portion 135 may be coupled to front and right ends of the frame 130. The arm fastening portion 135 may be coupled to an end of an arm 300. The arm 300 may be coupled to the arm fastening portion 135 and support the rear of the display panel 110 and/or the plate 120.

A driving unit 200 may be coupled to the frame 130 and/or the plate 120. The driving unit 200 may provide rotational force to the arm 300. The driving unit 200 may be actuated by electrical power supplied from the electrical equipment inside the box 133.

The arm 300 may extend lengthwise. One side of the arm 300 may be pivotally connected to the driving unit 200, and the other side may support the rear of the display panel 110 and/or the plate 120. The arm 300 may extend lengthwise from the driving unit 200 to end portions of the display panel 110. The arm 300 may pivot forward and rearward about the driving unit 200 by means of the driving unit 200. End portions of the arm 300 may be coupled to the arm fastening portion 135 and support the display panel 110.

The arm 300 may be provided as a pair of left and right portions. The arm 300 may include a first arm 300a and a second arm 300b. One side of the first arm 300a may be connected to the driving unit 200, and the other side may support a left end of the display panel 110. One side of the second arm 300*b* may be connected to the driving unit 200, and the other side may support a right end of the display panel 120.

Referring to FIGS. 4 and 5, the driving unit 200 may include a motor 210. The motor 210 may provide rotational force. The motor 210 may rotate in one direction and the other direction. A motor gear 211 may be connected to a rotating shaft of the motor 210. The motor gear 211 may rotate by power transferred from the motor 210.

The driving unit 200 may include a case 220. The case 220 may be disposed on an upper side of the motor 210 and have a space inside. A gear 231 and the motor gear 211 may be disposed within the case 220. The case 220 may include a lower case 221, an upper case 222, and a side case 233. The upper case 222 may be spaced upward from the lower case 221. The side case 223 may include a first side case 223*a* disposed on the left side of the case 220 and a second side case 223*b* disposed on the right side of the case 220. A lower end of the first side case 223*a* may be coupled to a left end of the lower case 221. An upper end of the first side case 223*a* may be coupled to a left end of the upper case 222. A lower end of the second side case 223*b* may be coupled to a right end of the lower case 221. An upper end of the second side case 223*b* may be coupled to a right end of the upper case 222.

The driving unit 200 may include a gear 231. The gear 231 may rotate by power transferred from the motor 210. A plurality of gears 231 may be provided. One of the plurality of gears 231 may rotate by engaging with the motor gear 211.

For example, the gear 231 may include a first gear 231*a* and a second gear 231*b*. The first gear 231*a* and the second gear 231*b* may rotate by engaging with each other. The second gear 231 may rotate by engaging with the motor gear 211. Thus, when the motor 210 rotates, the first gear 231*a* and the second gear 231*b* may rotate. The first gear 231*a* and the second gear 231*b* may rotate in opposite directions. Rotating shafts 232*a* and 232*b* of the gears 231*a* and 231*b* may be coupled to and supported by the upper case 222 and the lower case 221.

The arm 300 may be provided as a pair. The first arm 300*a* may be coupled to the first gear 231*a*. The second arm 300*b* may be coupled to the second gear 231*b*. When the motor 210 rotates to one side, the first arm 300*a* and the second arm 300*b* may pivot forward. When the motor 210 rotates to the other side, the first arm 300*a* and the second arm 300*b* may pivot rearward.

An arm hole 224 may be formed by opening the side case 223. The arm hole 224 may be formed by opening the first side case 223 and the second side case 223*b*. One end of the arm 300 may be disposed inside the case 220. An extended portion 312 of the arm 300 may be disposed between one end and the other end of the arm 300. The extended portion 312 may be disposed through the arm hole 224. The arm 300 may penetrate the arm hole 25 and extend out of the case 220, and the other end of the arm 300 may support display panel 110.

When the arm 300 pivots, the extended portion 312 may move from the arm hole 224. When the arm 300 pivots forward, the extended portion 312 may move forward from the arm hole 224. When the arm 300 pivots rearward, the extended portion 312 may move rearward from the arm hole 224.

A stopper 225 may be formed around the arm hole 224 or at a rear end of the arm hole 224. When the first arm 300*a* pivots rearward, the extended portion 312 may get caught on the stopper 225 and be kept from pivoting rearward any further. When the second arm 300*b* pivots rearward, the extended portion 312 may get caught on the stopper 225 and kept from pivoting rearward any further.

Referring to FIG. 6, an end 3241 of the arm 300 may be coupled to the arm fastening portion 135. The arm fastening portion 135 may protrude rearward from the display panel 110. A slide space 136 may be formed by recessing the arm fastening portion 135 forward. The arm fastening portion 135 may have a guide slot 137. The guide slot 137 may communicate with the slide space 136. A pair of guide slots 137 may be disposed in upper and lower sides of the slide space 136.

The end 3241 of the arm 300 may be disposed in the slide space 136. When the arm 300 pivots, the end 3241 of the arm 300 may move in the slide space 136. The arm fastening portion 135 may cover at least part of the end 3241 of the arm 300.

A pin hole 325 may be formed in the end 3241 of the arm 300. A pin 327 may have the shape of a cylinder that extends vertically and lengthwise. The pin 327 may vertically pass through the pin hole 325 and vertically protrude from the end 3241 of the arm 300. The pin 327 vertically protruding from the end 3241 of the arm 300 may be inserted into the guide slot 137 and couple the arm 300 and the arm fastening portion 135 together. The pin 327 may move along the guide slot 137 and move the end 3241 of the arm 300. The guide slot 137 may restrict the range of movement of the arm 300.

As another example, the end 3241 of the arm 300 may have a protrusion (not shown) that vertically protrudes. The protrusion (not shown) vertically protruding from the end 3241 of the arm 300 may be inserted into the guide slot 137 and couple the arm 300 and the arm fastening portion 135 together. The protrusion (not shown) may move along the guide slot 137 and cause the end 3241 of the arm 300 to move.

Accordingly, the arm 300 may support the display panel 110 and restrict the range of movement of the display panel 110.

Referring to FIGS. 7 to 9, the height of the arm 300 may be defined as the up-down (UD) length of the arm 300. The width of the arm 300 may be defined in a direction perpendicular to the up-down direction UD. The width of the arm 300 may be defined in a direction PD in which the arm 300 pivots. A direction in which the width of the arm 300 is formed may be named a width direction. The pivot axis of the arm 300 may be parallel to the up-down direction UD.

The arm 300 may have a T bar-shaped cross section. On a cross-section of the arm 300, a wing portion 323 and 324 may extend in the up-down direction UD. On a cross-section of the arm 300, a reinforcing portion 313 and 314 may protrude and extend from the wing portion 323 and 324 in a direction perpendicular to the up-down direction UD.

The arm 300 may have a head portion 311. The first coupling hole 311*a* may be formed by opening the head portion 311. The first coupling hole 311*a* may be positioned at or close to the center of the head portion 311. A gear shaft 232*a* and 232*b* (see FIG. 4) may pass through the first coupling hole 311*a* and be coupled to the head portion 311. The center of the first coupling hole 311*a* may serve as the pivot center of the arm 300.

A second coupling hole 311*b* may be formed by opening the head portion 311. The second coupling hole 311*b* may be formed around the first coupling hole 311*a*. A plurality of second coupling holes 311*b* may be provided. A coupling member (not shown) may pass through the second coupling hole 311*b* and couple or fasten the gear 231*a* and 231*b* and the head portion 311 together. For example, the coupling member (not shown) may be a screw.

The arm 300 may have an extended portion 312. The extended portion 312 may be formed by extending from the head portion 311 to one side. The extended portion 312 may extend lengthwise in one direction. The extended portion 312 may have a bar shape. The width w0 of the extended portion 312 may be larger than the height h12 of the extended portion 312.

The arm 300 may have a first bending portion 303. The arm 300 may have a second bending portion 304. The first bending portion 303 may be bent and extend rearward from the head portion 311 or the extended portion 312. The second bending portion 304 may be bent and extend forward from the first bending portion 303.

The first bending portion 303 may include a first reinforcing portion 313. The first bending portion 303 may include a first wing portion 323. The first reinforcing portion 313 may be coupled to or formed integrally with the first wing portion 323. The first reinforcing portion 313 may be positioned in front of the first wing portion 323. The first reinforcing portion 313 may protrude forward from a front surface of the first wing portion 323. The first reinforcing portion 313 may reinforce the rigidity of the first wing portion 323. The first reinforcing portion 313 may be named a first arm frame 313. The first wing portion 323 may be named a first arm wing 323.

The second bending portion 304 may include a second reinforcing portion 314. The second bending portion 304 may include a second wing portion 324. The second reinforcing portion 314 may be coupled to or formed integrally with the second wing portion 324. The second reinforcing portion 314 may be positioned in front of the second wing portion 324. The second reinforcing portion 314 may protrude forward from a front surface of the second wing portion 324. The second reinforcing portion 314 may reinforce the rigidity of the second wing portion 324. The second reinforcing portion 314 may be named a second arm frame 314. The second wing portion 324 may be named a second arm wing 324.

The first reinforcing portion 313 may be formed by being bent rearward from the extended portion 312 or the head portion 311. The first reinforcing portion 313 may be slanted rearward from the extended portion 312. The first reinforcing portion 313 may extend lengthwise in one direction. The lengthwise direction of the first reinforcing portion 313 may intersect the lengthwise direction of the extended portion 312. The first reinforcing portion 313 may have the shape of a bar.

The first reinforcing portion 313 may be positioned between the extended portion 312 and the second reinforcing portion 314. The first reinforcing portion 313 may connect the extended portion 312 and the second reinforcing portion 314. One end of the first reinforcing portion 313 may be connected to the extended portion 312, and the other end of the bending portion 313 may be connected to the second reinforcing portion 314.

The width w1 of the first reinforcing portion 313 may be larger than the height h13 of the first reinforcing portion 313. The width w1 of the first reinforcing portion 313 may be equal or similar to the width w0 of the extended portion 312. The height h13 of the first reinforcing portion 313 and the height h12 of the extended portion 312 may be equal or similar to each other. The length l1 the first reinforcing portion 313 extends may be equal or similar to the length l0 the extended portion 312 extends.

The second reinforcing portion 314 may be bent and extend forward from the first reinforcing portion 313. The second reinforcing portion 314 may be slanted forward from the extended portion 312. The direction in which the second reinforcing portion 314 extends may intersect the lengthwise direction of the extended portion 312. The second reinforcing portion 314 may be slanted forward from the first reinforcing portion 313. The direction in which the second reinforcing portion 314 extends may intersect the lengthwise direction of the first reinforcing portion 313. The length l2 the second reinforcing portion 314 extends may be larger than the length l1 the extended portion 312 extends.

The width w2 of the second reinforcing portion 314 may be equal or similar to its height h14. The width w1 of the first reinforcing portion 313 may be larger than the width w2 of the second reinforcing portion 314. The width w0 of the extended portion 312 may be larger than the width w2 of the second reinforcing portion 314. The length l2 the second reinforcing portion 314 extends may be larger than the length l1 the first reinforcing portion 313 extends. The length l2 the second reinforcing portion 314 extends may be larger than the length l0 the extended portion 312 extends.

The second reinforcing portion 314 may be curved. The second reinforcing portion 314 may have the center of curvature in front of the arm 300. The second reinforcing portion 314 may be curved and extend forward from an end of the first reinforcing portion 313 extending rearward from the extended portion 312. The second reinforcing portion 314 may be formed to bulge rearward from the front.

The first wing portion 323 may be coupled to the first reinforcing portion 313 or formed integrally with the first reinforcing portion. The first wing portion 323 may be positioned at the rear of the first reinforcing portion 313. The first reinforcing portion 313 may protrude forward from the front surface of the first wing portion 323. The first reinforcing portion 313 may be disposed at the center of the first wing portion 323. The first reinforcing portion 313 may intersect the first wing portion 323. The first reinforcing portion 313 may reinforce the rigidity of the first wing portion 323.

The first wing portion 323 may include a portion that extends parallel to the direction in which the first reinforcing portion 313 extends. The first wing portion 323 may include a portion that extends to the direction the extended portion 312 extends.

The first wing portion 323 may be formed in the shape of a thing plate. The width w1 of the first reinforcing portion 313 may be larger than the thickness or width of the first wing portion 323. The first wing portion 323 may form a surface that extends in the up-down direction UD. The height h21 of the first wing portion 323 may be larger than the height h13 of the first reinforcing portion 313.

The second wing portion 324 may be bent forward and extend lengthwise, along the second reinforcing portion 314 from the first wing portion 323. The second wing portion 323 may be coupled to the second reinforcing portion 314 or formed integrally with the second reinforcing portion 314. The end 3241 of the arm 300 may be an end of the second wing portion 324.

The second wing portion 324 may be formed in the shape of a thin plate. The width w2 of the second reinforcing portion 314 may be larger than the thickness or width of the second wing portion 324. The thickness of the second wing portion 324 may be equal to the thickness of the first wing portion 323. The second wing portion 324 may form a surface that extends in the up-down direction UD. The height h22 of the second wing portion 324 may be equal or similar to the height h21 of the first wing portion 323. The height h22 of the second wing portion 324 may be larger than the height h14 of the second reinforcing portion 314.

The second wing portion 324 may have the same curvature as the second reinforcing portion 314. The second wing portion 324 may have the center of curvature in front of the arm 300. The second wing portion 324 may be formed to bulge rearward from the front. The second wing portion 324 may be curved and extend forward from an end of the first wing portion 323.

A virtual line VL may be defined to extend lengthwise from the pivot center of the arm 300 adjacent to one end of the arm 300. The extended portion 312 may not be parallel to the virtual line VL. The extended portion 312 may slantingly extend rearward from the virtual line VL. The first bending portion 303 may slantingly extend rearward from the virtual line VL. The first bending portion 303 may be disposed behind the virtual line VL. A connecting region between the first bending portion 303 and the second bending portion 304 may be disposed behind the virtual line VL. The second reinforcing portion 314 may extend forward, from behind the virtual line VL to the other end of the arm 300.

Accordingly, the arm 300 is pivoted, whereby the rigidity of the arm 300 is reinforced against the stress exerted on the arm 300. Also, when the display panel 110 is bent forward as the arm 300 pivots, the arm 300 may be prevented from being deformed or broken where the stress is concentrated.

Moreover, the arm 300 includes a rearwardly bent portion and a forwardly curved portion. Thus, when the display panel 110 is bent forward as the arm 300 pivots, the arm 300 may not come into contact with or not get caught on the display panel 110 and the plate 120. In addition, the range in which the display panel 110 can be bent by the arm 300 may be increased. Further, the driving unit 200 (see FIG. 4) may become more compact in size.

The pinhole 325 may be formed near an end of the second wing portion 324. The pinhole 325 may be formed by vertically opening a portion near an end of the second wing portion 324. A coupling member (not shown) may be inserted in the pinhole 325. For example, the coupling member (not shown) may have the shape of a bar that extends vertically and lengthwise. The coupling member (not shown) may pass through the pinhole 325 and vertically protrude from the pinhole 325. One end and the other end of the coupling member (not shown) protruding from the pinhole 325 may be respectively inserted in a pair of guide slots 137 (see FIG. 6) that are vertically disposed. The coupling member (not shown) may connect the arm 300 and the guide slots 137.

Moreover, the arm 300 may be formed to have a T bar-shaped cross section. Thus, the arm 300 may be prevented from being distorted when the display panel 110 is pushed or pulled as the arm 300 is bent.

Referring to FIGS. 10 and 11, when the driving unit 200 is actuated, the arm 300 may pivot forward and rearward. Before the driving unit 200 is actuated, the display panel 110 is not in a bent position but in a flat position. When the driving unit 200 is actuated, the arm 300 is pivoted, whereby the display panel 110 may be bent.

When the arm 300 is pivoted forward, the end 3241 of the arm 300 may push the display panel 110 forward. Once the arm 300 is pivoted forward, the display panel 110 may be bent forward. The display panel 110 may be bent to have the center of curvature in front of it.

When the arm 300 is pivoted rearward, the end 3241 of the arm 300 may pull the display panel 110 rearward. Once the arm 300 is pivoted rearward, the display panel 110 may become flat without the curvature.

Referring to FIGS. 12 and 13, when the arm 300 is pivoted forward, the display panel 110 may be bent, whereby the arm fastening portion 135 and the end 3241 of the arm 300 may get farther away from each other. The end 3241 of the arm 300 may be movable in the slide space 136. The guide slots 137 (see FIG. 6) may guide the movement of the end 3241 of the arm 300.

When the display panel 110 is bent, a portion of the display panel 110 and/or the plate 120 may overlap the virtual line VL. The first bending portion 303 may be disposed behind the virtual line VL. The second bending portion 304 may be disposed behind the virtual line VL. A connecting region between the first bending portion 303 and the second bending portion 304 may be disposed behind the virtual line VL.

Accordingly, when the display panel 110 is bent as the arm 300 pivots, the arm 300 may not get caught on the display panel 110 or the plate 120, and the range in which the display panel 110 is bent may be increased.

Referring to FIGS. 1 to 17, the display device may include: a flexible display panel 110; a flexible plate 120 which is positioned behind the display panel 110 and to which the display panel 110 is coupled; a driving unit 200 coupled to a rear of the plate 120 and providing a rotational force; and an arm extending long, having one side pivotally connected to the driving unit 200 by the rotational force, and having the other side supporting the display panel 110.

The arm 300 may include: a first bending portion 303 adjacent to the pivot axis of the arm 300 and extending rearward; and a second bending portion 304 bent and extending forward from the first bending portion 303 and supporting the display panel 110.

The second bending portion 304 may be curved to form a center of curvature in front of it.

When a virtual line VL is defined to connect the pivot axis of the arm 300 to an end of the arm 300 supporting the display panel 110, a connecting region between the first bending portion 303 and the second bending portion 304 may be positioned behind the virtual line VL.

The first bending portion 303 may include a first arm frame 313 having a width w1 defined along a direction perpendicular to the pivot axis and having a height h13 defined along a direction parallel to the pivot axis, the width w1 larger than the height h13.

The second bending portion 304 may include a second arm frame 314, and the width w1 of the first arm frame 313, which is defined along a direction perpendicular to the pivot axis, may be larger than a width w2 of the second arm frame 313.

A length l2 the second bending portion 304 extends may be larger than a length l1 the first bending portion 303 extends.

The arm 300 may include an extended portion 312 which extends from the pivot axis of the arm 300 to one side, and the first bending portion 303 may be bent and extend rearward from the extended portion 312.

The arm 300 may be formed in a shape of a T bar.

A guide slot 135 may be further included which supports the display panel 110 and which is coupled to the other side of the arm 300 to guide the movement of the other side of the arm, when the display panel 110 is bent as the arm 300 pivots forward, the other side of the arm 300 may move from one side toward the other side of the guide slot 135.

The arm 300 may include: a first arm 300a having one side which is connected to one side of the display panel 110 and having the other side which is connected to the driving unit 200; and a second arm 300*b* having one side which is connected to the other side of the display panel 110 and having the other side which is connected to the driving unit 200.

The driving unit 200 may include: a first gear 231*a* connected to the first arm 300*a*; a second gear 231*b* engaged with the first gear 231*a* and connected to the second arm 300*b*; and a motor 210 that rotates the first gear 231*a* and the second gear 231*b*.

The driving unit 200 may include: a case 220 with a space inside, where one end of the arm 300 is disposed; an arm hole 224 which is formed by opening one side of the case 200 along an area where the arm 300 pivots and moves and through which the arm 300 passes; and a stopper 225 formed around the arm hole 224 and restricting the arm 300 from pivoting any further by coming into contact with the arm 300.

Some embodiments or other embodiments of the present disclosure described above are not mutually exclusive or distinct from one another. Some embodiments or other embodiments of the present disclosure described above may be used in combination with or combined with each configuration or function.

For example, it means that configuration A described in specific embodiments and/or drawings and configuration B described in other embodiments and/or drawings may be combined. In other words, even when a combination of configurations is not described directly, it means that the combination is possible except when it is described that the combination is impossible.

The above detailed description should not be construed as limiting in all respects but should be considered as illustrative. The scope of the present disclosure should be determined by reasonable interpretation of the appended claims, and all changes within the equivalent scope of the present disclosure are included in the scope of the present disclosure.

What is claimed is:

1. A display device comprising:
a flexible display panel;
a flexible plate which is positioned behind the display panel and to which the display panel is coupled;
a driving unit coupled to a rear of the plate;
an arm extending long between an edge of the plate and the driving unit, and having one side pivotally connected to the driving unit; and
an arm fastening portion which is formed at the plate adjacent to the edge of the plate and to which an other side of the arm is movably coupled,
wherein the arm comprises:
a first bending portion adjacent to a pivot axis of the arm and extending rearward; and
a second bending portion bent and extending forward from the first bending portion and supporting the display panel,
wherein the second bending portion is curved to form a center of curvature in front thereof.

2. The display device of claim 1, wherein, when a virtual line (VL) is defined to connect the pivot axis of the arm to an end of the arm supporting the display panel,
a connecting region between the first bending portion and the second bending portion is positioned behind the virtual line (VL).

3. The display device of claim 1, wherein the first bending portion comprises a first arm frame having a width (w1) defined along a direction perpendicular to the pivot axis and having a height (h13) defined along a direction parallel to the pivot axis, the width (w1) larger than the height (h13).

4. The display device of claim 3, wherein the second bending portion comprises a second arm frame, and
the width (w1) of the first arm frame, which is defined along a direction perpendicular to the pivot axis, is larger than a width (w2) of the second arm frame.

5. The display device of claim 1, wherein a length (l2) the second bending portion extends is larger than a length (l1) the first bending portion extends.

6. The display device of claim 1, wherein the arm is formed in a shape of a T bar.

7. The display device of claim 1, wherein the arm fastening portion further comprises a guide slot which is formed at the arm fastening portion and which extends in a direction of movement of the other side of the arm,
wherein the arm comprises a protrusion which protrudes from the other side of the arm and which is movably inserted into the guide slot.

8. The display device of claim 1, wherein the arm comprises:
a first arm having one side which is connected to one side of the display panel and having an other side which is connected to the driving unit; and
a second arm having one side which is connected to the other side of the display panel and having an other side which is connected to the driving unit.

9. The display device of claim 8, wherein the driving unit comprises:
a first gear connected to the first arm;
a second gear engaged with the first gear and connected to the second arm; and
a motor that rotates the first gear and the second gear.

10. The display device of claim 1, wherein the driving unit pivots the arm, and
wherein the other side of the arm pushes or pulls the arm fastening portion by sliding on the arm fastening portion in response to pivoting of the arm.

11. The display device of claim 1, wherein the arm fastening portion comprises a slide space which is recessed forward from the arm fastening portion and into which the other side of the arm is movably inserted.

12. A display device comprising:
a flexible display panel;
a flexible plate which is positioned behind the display panel and to which the display panel is coupled;
a driving unit coupled to a rear of the plate;
an arm extending long between an edge of the plate and the driving unit, and having one side pivotally connected to the driving unit; and
an arm fastening portion which is formed at the plate adjacent to the edge of the plate and to which the other side of the arm is movably coupled,
wherein the arm comprises;
an extended portion which extends from a pivot axis of the arm to one side;
a first bending portion bent and extending rearward from the extended portion; and
a second bending portion bent and extending forward from the first bending portion and supporting the display panel.

13. A display device comprising:
a flexible display panel;
a flexible plate which is positioned behind the display panel and to which the display panel is coupled;
a driving unit coupled to a rear of the plate;

an arm extending long between an edge of the plate and the driving unit, and having one side pivotally connected to the driving unit; and an arm fastening portion which is formed at the plate adjacent to the edge of the plate and to which the other side of the arm is movably coupled, wherein the driving unit comprises:

a case with a space inside, where one end of the arm is disposed;

an arm hole which is formed by opening one side of the case along an area where the arm pivots and moves and through which the arm passes; and a stopper formed around the arm hole and restricting the arm from pivoting any further by coming into contact with the arm.

* * * * *